Patented Dec. 11, 1923.

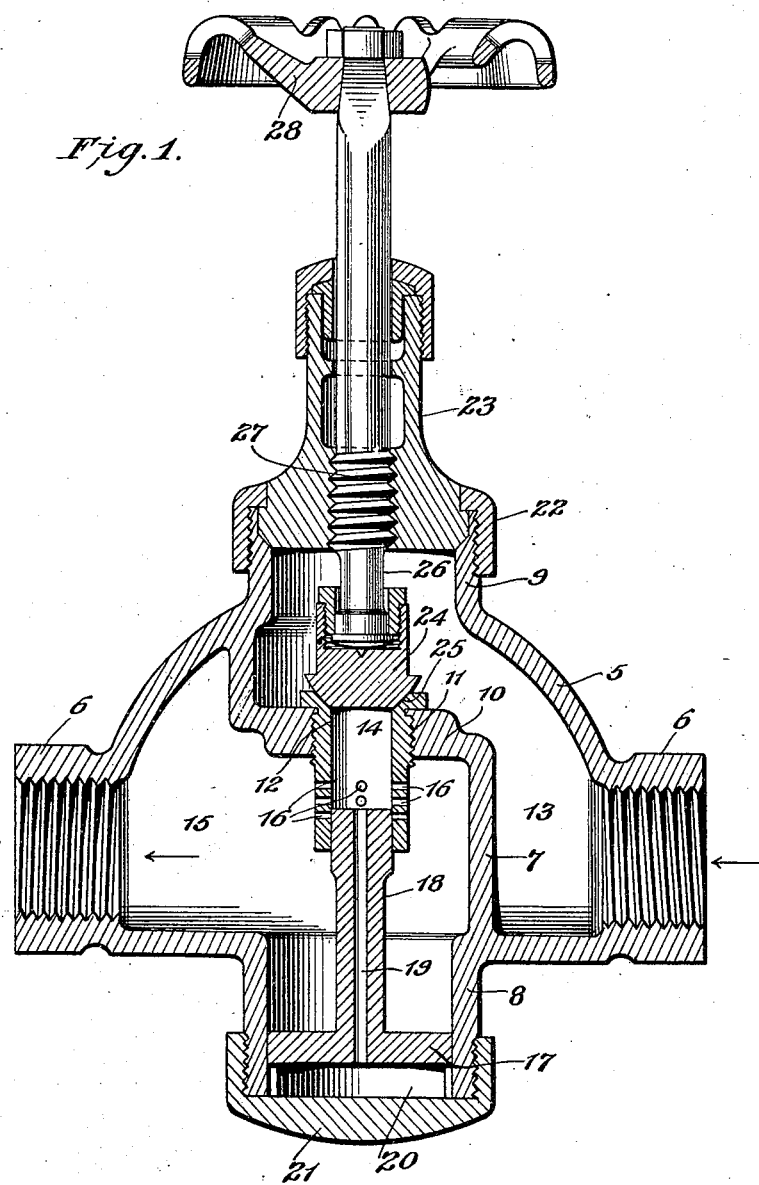

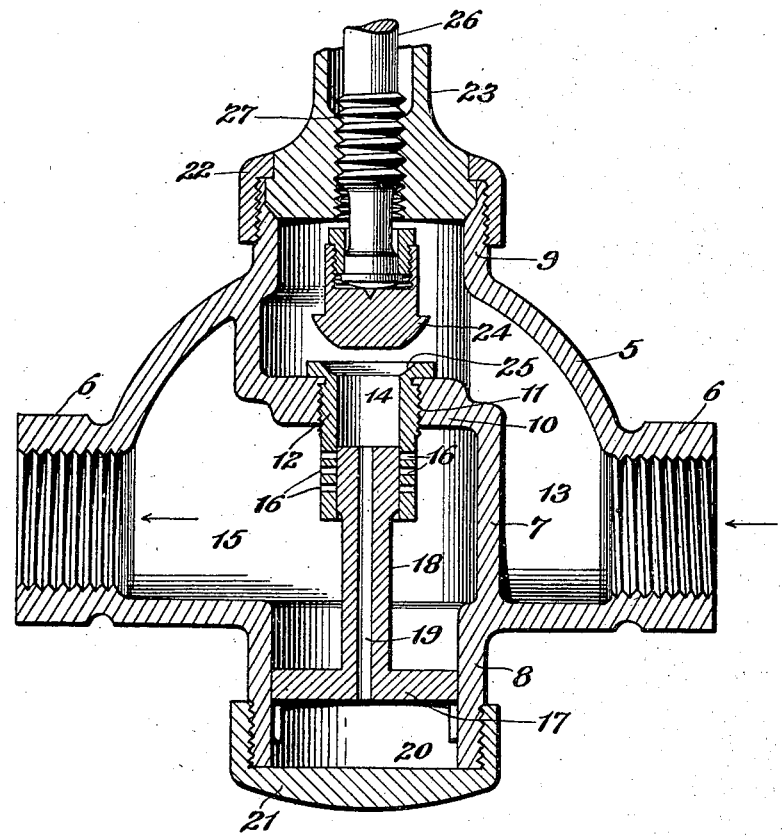
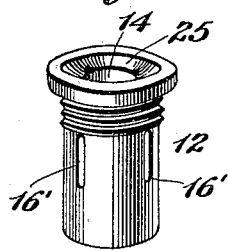

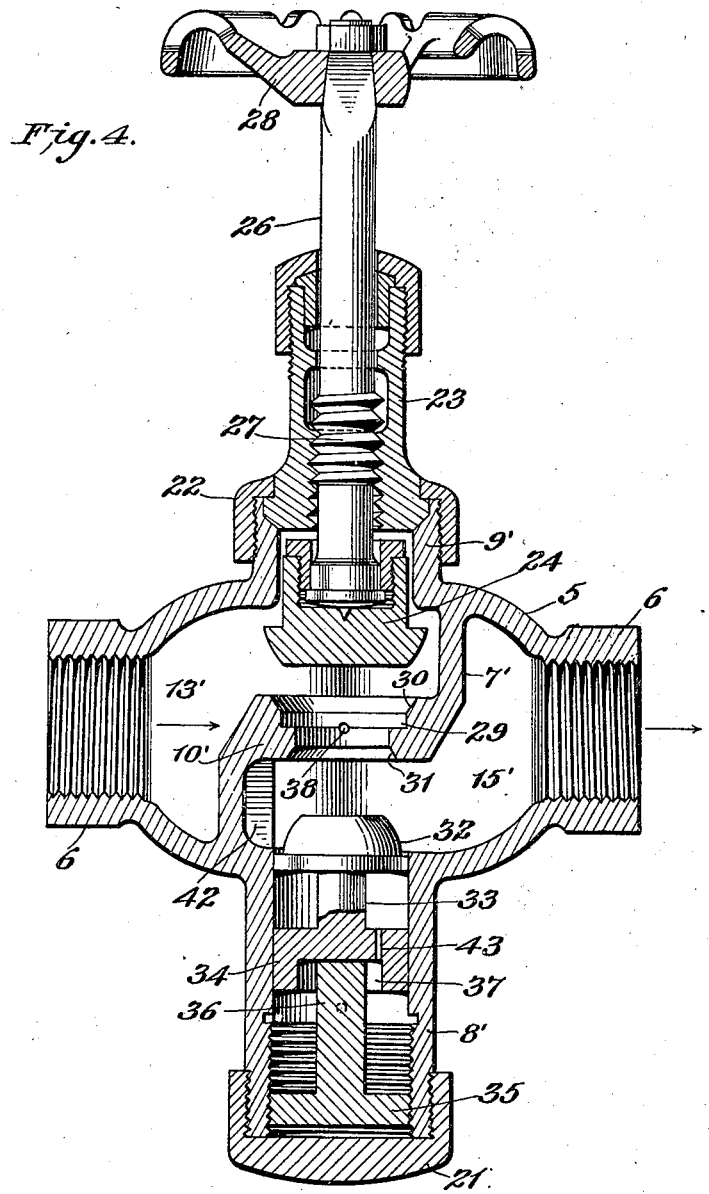

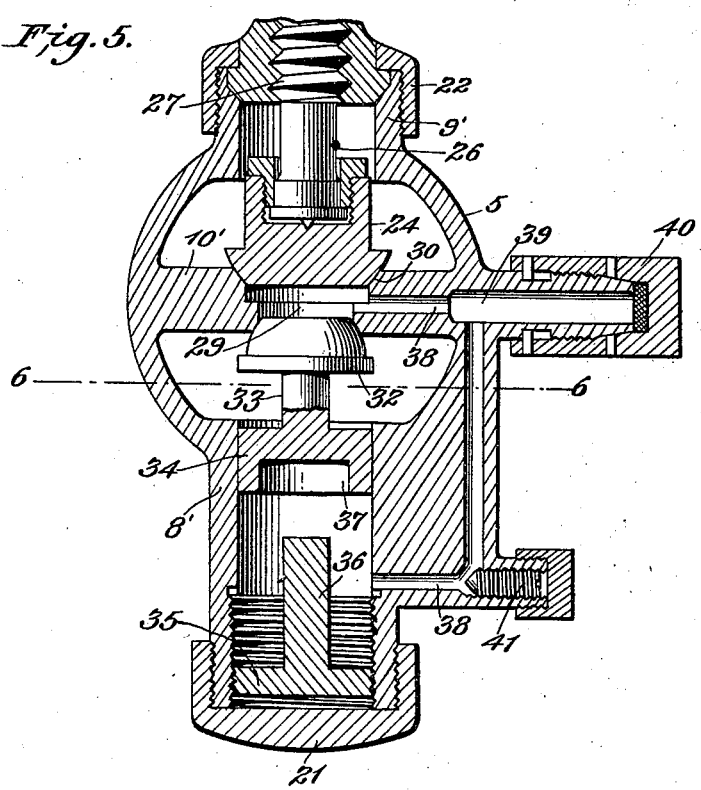
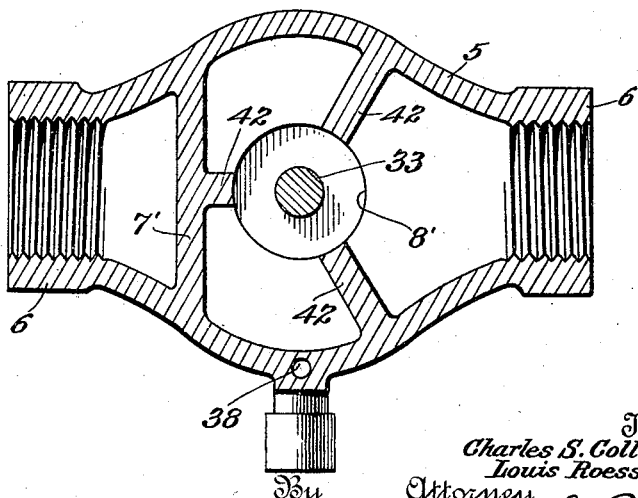

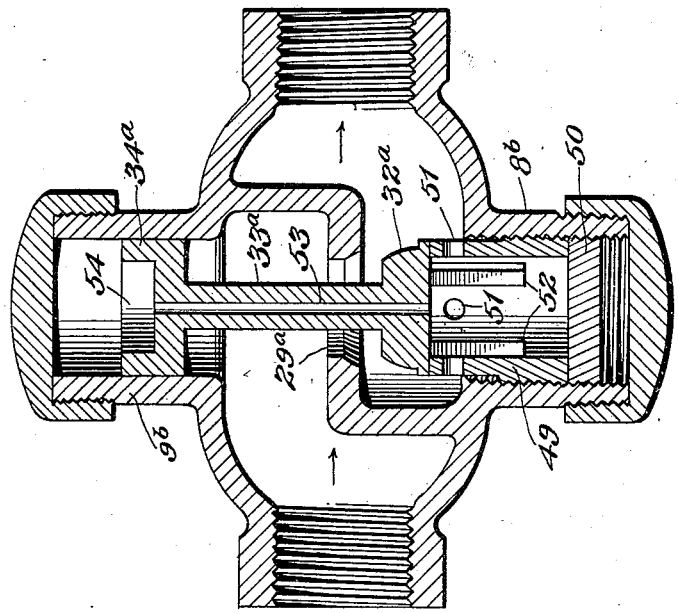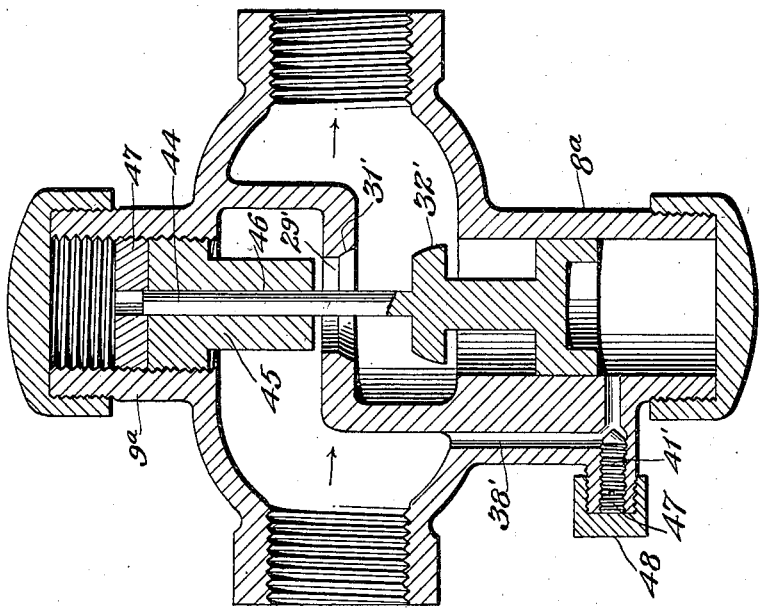

1,477,244

UNITED STATES PATENT OFFICE.

CHARLES S. COLLINS, OF NEW YORK, AND LOUIS ROESSEL, OF BROOKLYN, NEW YORK.

APPARATUS FOR CONTROLLING THE MAXIMUM FLOW OF FLUIDS.

Application filed November 18, 1919. Serial No. 338,941.

*To all whom it may concern:*

Be it known that we, CHARLES S. COLLINS, a citizen of the United States, and a resident of the borough of the Bronx, county of the Bronx, city and State of New York, and LOUIS ROESSEL, a citizen of the United States, and a resident of the borough of Brooklyn, county of Kings, city and State of New York, have jointly invented new and useful Improvements in Apparatus for Controlling the Maximum Flow of Fluids, of which the following is a specification.

This invention relates to an improved method and apparatus for controlling the maximum flow of fluids and generically considered, has for its object to provide a novel means which will positively limit the maximum flow of gaseous or liquid fluids through a pipe or conduit.

The present improvement also comprehends an improved regulator or controller of such construction that the maximum flow of the fluid may be readily varied within certain limits.

In the practical attainment of the purposes of our invention in an efficient and economical manner, we have devised an improved pressure actuated control valve whereby a maximum gravimetric or volumetric flow of the fluid is automatically limited by the difference in pressures at the ingress and egress sides of orifices caused by the velocity of flow of the fluid through the orifice. These pressure differences at opposite sides of the orifice being due to the velocity of flow of the fluid through said orifice, it follows that if the maximum drop or decrease in pressure is limited and consequently the maximum velocity of flow through the orifice, then the maximum volumetric flow of the fluid will be thereby limited. The maximum volumetric flow may be controlled and varied when the pressure drop is fixed by varying the area or number of the orifices, or, if desired, both the pressure drop required to actuate the control valve, as well as the area and number of the orifices may be varied to thereby obtain a greater range of variation in the maximum flow of the fluid.

With the above and other objects in view, the invention consists in the improved maximum fluid flow regulation and control means, as will be hereinafter more fully described in detail, illustrated in the accompanying drawings and subsequently incorporated in the subjoined claims.

In the drawings wherein similar reference characters designate corresponding parts throughout the several views, and in which we have disclosed several practical embodiments of the maximum flow regulating valve constituting a part of the subject matter of this specification.

Fig. 1 is a longitudinal sectional view through the regulator, showing the piston valve in its open position;

Fig. 2 is a similar view illustrating the manner in which the valve is moved to its closed position upon a maximum decrease of pressure at the discharge side of the orifice;

Fig. 3 is a detail perspective view of the adjustable valve plug showing a slightly modified form thereof;

Fig. 4 is a sectional view similar to Fig. 1, disclosing another embodiment of our invention;

Fig. 5 is a sectional view showing the hand valve and the piston valve of the construction illustrated in Fig. 4 in their closed positions;

Fig. 6 is a horizontal sectional view taken on the line 6—6 of Fig. 5;

Fig. 7 is a sectional view illustrating another alternative form of the regulator valve; and Fig. 8 is a similar view illustrating a further modification.

Referring in detail to the drawings and more particularly to Figs. 1, 2 and 3 thereof which illustrate a preferred embodiment of the fluid flow regulating valve which we have found to give the most satisfactory results in practice, 5 designates the valve body or casing having oppositely disposed internally threaded bosses or extensions 6 to which the fluid conduit or pipe sections of the supply line (not shown) are adapted to be coupled. As herein shown, this valve body or casing is formed with an interior transverse bridge wall or partition 7 which extends between the upper and lower sides of the valve body, and integrally connects the side walls thereof to each other. This partition wall is of angular form, and at one of its ends is joined to the base or bottom wall of the valve casing at one side of the downwardly extending tubular portion 8, while the other end of said wall is similarly joined to the upper side of the body wall 5, and at the relatively opposite side of an upwardly extending tubular portion 9. The partition wall 7, intermediate of its ends, has a horizontal portion 10 provided with a threaded opening 11 to receive an adjustable flow regulating plug 12.

The specific form and construction of the valve body or casing as above described, provides an inlet passage 13 for the fluid, said passage communicating with the upper tubular extension 9 of the valve body and with the upper end of the bore 14 in the adjustable plug 12. The discharge passage or chamber 15 through the valve body on the relatively opposite side of the angular partition wall 7, is in communication with the tubular extension 8 on the valve body.

As seen in Fig. 1 of the drawings, the adjustable hollow plug 12 is provided with one or more longitudinally spaced orifices 16 through which the fluid may flow from the inlet chamber or passage 13 of the valve body to the outlet or discharge passage 15 thereof.

17 designates a piston which freely reciprocates within the tubular extension 8 on the valve body 5. This piston is provided with a valve stem 18 which extends upwardly therefrom and at its upper end has a sliding fit in the bore 14 of the plug 12. This valve stem is formed with an axial bore 19 which at its upper end communicates with the plug bore 14 and at its lower end with the piston chamber 20.

In operation of the regulator as above described, the fluid flowing in the direction indicated by the arrows in Fig. 1, passes through the inlet passage 13 of the regulator and through the series of orifices 16 in the plug 12 to a reduced pressure in relation to the initial pressure within the discharge passage 15. The fluid under the initial pressure at which it enters the regulator, also passes downwardly through the bore 19 into the chamber 20 beneath the piston 17. Under normal operating conditions, the discharge pressure acting on the upper side of this piston together with the weight of the regulator valve, prevents lifting of the valve under the pressure in the chamber 20, so that the valve will remain in its lower open position as seen in Fig. 1, and the fluid may continue to flow freely through the orifices 16. When, owing to the velocity of flow, a decrease in pressure at the discharge side of the orifice occurs, there is a decrease in pressure on the upper side of the piston 17 so that the fluid pressure in the chamber 20 overcomes the weight of the valve and forces the regulator valve upwardly. The upper end of the valve stem 18 will thus close the orifices 16 in the plug 12, and thereby shut off the flow of the fluid through these orifices. It will thus be apparent that the maximum permissible flow of the fluid through the regulator will be limited. The pressure drop in the discharge side of the orifice, which is required in order to close the orifices 16, may be varied by varying the weight of the valve or by varying the relative areas of the upper and lower sides of the piston 17, against which the differential fluid pressures act. Thus, the maximum permissible flow of the fluid through the regulator will be varied accordingly. This variation in the maximum flow may also be readily obtained by adjusting the plug 12 so that any number of the orifices or ports 16 therein will be closed by the upper end of the valve stem 19.

In Fig. 3 of the drawings, we have shown a slightly different form of the adjustable plug 12, wherein slots 16' are provided in lieu of the spaced orifices 16. The area of these slots or openings through which the fluid may flow from the inlet to the discharge side of the regulator, may be varied by the adjustment of the plug in the manner above referred to.

The lower side of the piston valve chamber 20 is closed by the cap 21 which is threaded on the extension 8 of the body of the regulator.

A closure cap 22 is also threaded upon the extension 9 and carries a sleeve 23, the lower end of which is seated upon the wall of said extension. A manually operable valve 24 is adapted to be engaged upon a seat 25 formed in the upper end of the bore 14 of the plug 12, said valve being operatively connected to the lower end of a valve rod 26, which has threaded engagement as at 27 within the sleeve 23. This rod may be provided at its upper end with a hand wheel 28 or any other preferred means whereby the valve 24 may be conveniently operated. By means of this manually operable valve, the flow of fluid through the regulator may be cut off at any time.

In Figs. 4, 5 and 6 of the drawings, we have illustrated another embodiment of our invention wherein the regulator valve body 5' is divided by means of the partition wall 7' into inlet and discharge chambers 13' and 15' respectively. The horizontal section 10' of the wall 7' is provided with an orifice 31, the inlet side 30 of which is flared and leads to the enlargement 29 of the orifice, while the outlet side of said orifice is of variable emission area. The outlet side of said orifice is provided with a seat for the valve head 32 which is connected by the stem 33 to a piston 34 which reciprocates in the tubular extension 8' of the body of the regulator. The distance of the valve head 32 from its seat when the regulator is fully open as seen in Fig. 4, may be varied by means of the adjustable plug 35 which is threaded within the lower end of the extension 8' and has an upwardly projecting stem 36 extending into the pressure receiving chamber 37 of the piston 34.

A by-pass 38 communicates with the orifice 31 at one of its ends, and at the inlet side thereof, while the other end of this by-pass communicates with the hollow extension 8' between the adjustable plug 35 and the piston 34. This by-pass is provided with an outlet extension 39 normally closed by means of the cap 40. A needle valve 41 is also provided and may be readily adjusted to regulate the flow of the pressure fluid through the discharge end of the by-pass and beneath the piston 37.

The valve head 32 is guided in its vertical movement by means of a plurality of webs 42 which are radially disposed and integrally formed with the wall of the regulator body.

When the manually operable shut-off valve 24' is in an open position as seen in Fig. 4 and the regulator valve 32 and its piston are also in an open position, the fluid flowing in the direction indicated by the arrows enters the regulator through the inlet chamber 13' thereof and passes through the orifice 31 to a relatively lower pressure in the discharge passage 15' of the regulator owing to the velocity flow of the fluid through said orifice which is of restricted or limited annular form and the area of which may be readily varied by the adjustment of the plug 35. The pressure of the fluid before it passes through the orifice 31 is transmitted by the by-pass 38 to the under side of the piston 37. The upper side of this piston is subject to the pressure of the fluid after it has passed through the orifice. When the difference in pressure exerted against the opposite sides of the piston is sufficient to overcome the weight of the piston with its valve 32, the valve will be raised by the inlet pressure acting against the under side of the piston, and moved towards its seat 31 to a closed position. In this arrangement, the pressure difference which is required in order to thus raise the valve, may be regulated by increasing or decreasing the weight of the piston valve or by changing the area of the piston with relation to the area of the outlet side of the orifice 31. With a fixed weight of the piston valve and a fixed piston area, the pressure difference which is required to raise the valve will be constant, and as this pressure difference is due to the drop or decrease in pressure in the passage of the fluid through the orifice 31 caused by velocity flow, the valve will close at a definite though variable pressure drop. The maximum flow or rate of flow of the fluid through the regulator may be varied by changing the relative areas of the inlet and outlet sides of the orifice 31, and consequently changing the velocity flow through said orifice with relation to the initial pressure.

In the piston 37 there is provided an orifice or by-pass 43 which is appreciably smaller than the diameter of the by-pass 38. When the regulator valve is closed and the manually operable valve is open, this by-pass permits the pressure beneath the piston 37 to enter the discharge side of the regulator and gradually build up the pressure therein until it equals the pressure on the inlet side of the regulator. The piston valve will then drop by gravity to its open position.

By removing the cap 40, the pressure on the under side of the piston 37 may be quickly relieved to cause the valve 32 to open. The manually operable valve 24 may be closed at any time to shut off the flow of fluid through the regulator and when this valve is closed upon its seat, it will also shut off the flow of fluid through the main by-pass 38 and through the piston by-pass 43.

It will be evident from the foregoing description, that in this alternative form of the regulator, the maximum gravimetric or volumetric flow of fluids may likewise be variably limited.

In Fig. 7 of the drawings we illustrate another construction in which a piston valve 32' similar in form to the valve illustrated in Fig. 4, is provided with a guide stem 44 extending upwardly through the axial bore 46 in an adjustable plug 45, the upper end of which has threaded engagement within the tubular projection 9ᵃ on the body of the regulator. This plug is secured in its adjusted position by means of the lock nut 47 having a central opening through which the stem 44 projects. The orifice 29' is provided at its outlet side with the seat 31' for the valve 32'. The area of this orifice at its inlet side may be varied by the adjustment of the plug 45 as will be readily understood.

In this construction, the by-pass 38' communicates directly with the inlet side of the regulator and opens into the depending extension 8ᵃ on the regulator body beneath the valve piston. An adjustable needle valve 41' is also provided for regulating the area of the by-pass 38', the said valve as in the construction previously referred to, being in the form of a removable screw threaded in a lateral extension 47 of the by-pass which is closed by the cap 48. By removing this cap and the screw, the pressure beneath the valve piston may be released so as to permit the valve to move to its open position.

In the operation of this latter construction of the regulator, it will be seen that when the valve is in its open position, the fluid flows freely in the direction of the arrows through the orifice 29' and over the top or head of the valve 32'. The inlet pressure is also transmitted through the by-pass 38' to the under side of the valve piston. Upon a decrease in pressure in the discharge side of the line, the inlet pressure beneath the piston overcomes the weight of the valve, and thus raises the valve to its seat to cut off the flow of the fluid through the orifice 29'. The maximum flow or velocity of the fluid through the orifice may be easily and quickly varied by the adjustment of the plug 45.

In Fig. 8 of the drawings, another alternative construction is illustrated, and in this arrangement the valve 32ª is provided with a stem 33ª extending upwardly through the orifice 29ª and upon the upper end of this stem, the piston 34ª is formed, said piston reciprocating in the tubular extension 9ᵇ on the body of the regulator.

The extension 8ᵇ on the lower side of the regulator body, is interiorly threaded to receive an adjustable sleeve 49 which is held in adjusted position by means of the lock nut 50. Adjacent to its upper end this sleeve is provided with a series of circumferentially spaced orifices 51. The valve 32ª is provided on its under side with spaced guide fingers 52 which extend downwardly into the sleeve 49. A by-pass or a bore 53 extends axially through the valve and its stem 33ª, and communicates at its upper end with the pressure receiving chamber 54.

In this last described construction, the sleeve 49 is properly adjusted so as to position the valve 32ª at the desired distance from its seat when said valve is in its lower open position. The fluid is therefore free to flow in the direction indicated by the arrows through the orifice 29ª over the valve head and around the adjustable sleeve and through the ports or orifices 51 therein to the outlet side of the regulator. The lower side of the piston 34ª is subject to the pressure of the fluid before passing through the orifice while the upper side of said piston is subjected to the outlet fluid pressure which passes upwardly through the by-pass 53 which communicates with the interior of the sleeve 49. When the difference in these pressures acting against the opposite sides of the piston, is sufficient so that the inlet pressure will overcome the weight of the valve, the valve will be forced upwardly to its seat. The decrease in pressure necessary to thus close the orifice being constant, the maximum flow of the fluid may be varied by adjusting the sleeve 49 and thus varying the area of the orifice at its outlet side. The drop or decrease in pressure necessary to effect the closing movement of the valve may also be varied as in the other instances before referred to by increasing or decreasing the weight of the valve.

From the foregoing description considered in connection with the accompanying drawings, the several means whereby the desired result may be successfully attained in practice, will be fully and clearly understood. We have herein shown several forms of fluid pressure actuated valves, which it will be understood, are merely illustrated and in no sense to be construed as limiting the utility or adaptability of our invention since it is possible to utilize various other forms of valves, such for instance as the well known truncated cone valve. The automatic control and regulation of the maximum flow of gases or other fluids, is highly desirable and advantageous in numerous industries. Primarily, however, our invention is designed for use in connection with rivet heaters wherein a combustible gas or other heat generating fluid is supplied to the heater. In the use of such devices, the supply hose or tube may be accidentally cut or broken, resulting in an escape of the gas. If the tube is equipped with our present improvements, it will be apparent that if the supply tube or hose should be cut or broken, there will be a reduction in pressure at the discharge side of the regulator orifice and the regulator valve will then immediately and automatically move to a closed position. When the leak is repaired, the regulator will automatically open by the building up of the pressure on the discharge side of the regulator so that the pressure requisite for the operation of the heater will be renewed. It is to be borne in mind that the instance just referred to is but one of the numerous applications to which the present invention may be advantageously adapted. Of course, the size as well as the form and construction of the regulator body and its several parts may be varied as the necessities of the particular case may require. Therefore, while we have herein disclosed several practical embodiments of our improved fluid flow regulator, the invention may likewise be exemplified in numerous other alternative constructions, and we accordingly reserve the privilege of adopting all such legitimate changes as may be fairly embodied within the spirit and scope of the invention as claimed.

We claim:

1. A maximum flow regulating valve comprising a casing having inlet and outlet chambers and an orifice affording communication between said chambers, a hand valve at one side of the orifice to open and close the same, and a pressure actuated valve at the opposite side of said orifice operated automatically independently of the hand valve by variations in pressure in said inlet and outlet chambers to limit the volume of flow of the fluid through said orifice in proportion to the decrease in fluid pressure at the outlet side of the valve.

2. A maximum flow regulating valve comprising a casing having inlet and outlet chambers and an orifice affording communication between said chambers, a hand operated valve for opening and closing said orifice, and a fluid pressure actuated valve operated independently of the hand valve upon decrease of the outlet pressure with respect to the inlet pressure to automatically control the volumetric flow of the fluid through said orifice and limit the maximum flow thereof in proportion to the decrease in pressure at the outlet side of the valve.

3. A maximum flow regulating valve comprising a casing having a partition wall providing inlet and outlet chambers, a tubular plug mounted in said wall and provided with openings affording communication between said chambers, and a pressure actuated valve having a stem slidable in said tubular plug and provided with an axially extending passage connecting the inlet side of the valve with one side of said valve member, the opposite side of the valve member being influenced by the outlet pressure, whereby upon a decrease of pressure in the outlet chamber, said valve is operated to control the flow of the fluid through the openings in said plug and limit the maximum volumetric flow of said fluid in accordance with the decreased outlet pressure.

4. A maximum flow regulating valve comprising a casing having inlet and outlet chambers and an orifice affording communication between said chambers, means for variably regulating the flow of fluid through said orifice, a valve member controlling the flow of fluid through the orifice, and said valve member having a by-press communicating with the inlet chamber to conduct fluid under pressure therefrom to one side of the valve, the opposite side of the valve being subject to the pressure of fluid in the outlet chamber, whereby upon a decrease of pressure in the outlet chamber, the valve is moved by the inlet pressure to a closed position to thereby limit the maximum flow of fluid through said orifice.

5. A maximum flow regulating valve comprising a casing having a partition wall providing inlet and outlet chambers, a tubular plug adjustable in said wall and having openings affording communication between said inlet and outlet chambers, said plug being adjustable to vary the flow of fluid therethrough from the inlet to the outlet chamber, and a valve arranged in the outlet chamber and subject to the pressure therein, said valve having a part operating within the bore of said plug and provided with a by-pass to conduct the fluid under pressure from the inlet chamber to one side of said valve whereby, upon a decrease of pressure in the outlet chamber, the valve is operated to close the openings in said plug and limit the maximum flow of fluid therethrough.

6. A maximum flow regulating valve comprising a casing having inlet and outlet chambers and a tubular member affording communication between said chambers, said member having a plurality of longitudinally spaced series of openings in its wall affording communication between the bore of said member and the outlet chamber, and a valve operating within said tubular member subject upon one side to the pressure of fluid within the outlet chamber, said valve having a by-pass to conduct fluid under pressure from the inlet chamber to the opposite side of the valve, whereby said valve is moved upon a decrease of pressure in the outlet chamber to close the openings in said tubular member and limit the maximum flow of fluid through said member.

In testimony that we claim the foregoing as our invention, we have signed our names.

CHARLES S. COLLINS,
LOUIS ROESSEL.